United States Patent [19]

Dezio et al.

[11] Patent Number: 4,756,857

[45] Date of Patent: Jul. 12, 1988

[54] PROCESS OF APPLYING A TOP ELEMENT TO A CONTAINER UTILIZING A HOT MELT MATERIAL

[75] Inventors: John Dezio, Weston, Conn.; Leonard A. Blomquist, Joliet, Ill.; Michael J. Racanelli, Rosemont, Ill.; John M. Ross, DesPlaines, Ill.

[73] Assignee: Continental Plastic Containers, Inc., Stamford, Conn.

[21] Appl. No.: 756,172

[22] Filed: Jul. 18, 1985

[51] Int. Cl.[4] .................... B29C 39/10; B29C 39/44; B65D 41/04

[52] U.S. Cl. .................... 264/40.1; 215/1 C; 264/262; 264/263; 264/268; 264/274; 425/809

[58] Field of Search .................... 264/40.1, 262, 268, 264/274, 263, 323; 425/809; 215/1 C, 355, 356; 220/67

[56] References Cited

U.S. PATENT DOCUMENTS

| | | | |
|---|---|---|---|
| 3,542,913 | 11/1970 | Robinson et al. | 264/262 X |
| 4,104,343 | 8/1978 | Cornelius | 264/40.1 |
| 4,312,824 | 1/1982 | Mori et al. | 264/268 X |
| 4,523,540 | 6/1985 | Walter | 118/63 |

Primary Examiner—Jeffery Thurlow
Assistant Examiner—Leo B. Tentoni
Attorney, Agent, or Firm—Charles E. Brown

[57] ABSTRACT

This relates to the forming of a seal between a container and a top element, such as a fitment, wherein the seal is subjected to a high top loading of a nature wherein conventional gasket materials, such as plastisols, will unduly flow and result in leakage. In lieu of the conventional gasket material, a hot melt material is utilized with the hot melt material being in a flowable state when the fitment is applied to the container and held in place by a mechanical interlock between the fitment and the container so as to cause an extrusion and flowing of certain of the hot melt material wherein the hot melt material functions both as a gasket and as a support to eliminate or restrain movement between the fitment and the container due to top loading. A special dispensing head is also provided for applying a controlled volume of hot melt material to each fitment in a preselected pattern.

6 Claims, 2 Drawing Sheets

PROCESS OF APPLYING A TOP ELEMENT TO A CONTAINER UTILIZING A HOT MELT MATERIAL

This invention relates in general to new and useful improvements in the sealing of closure-like elements to the neck finish of containers, and more particularly to the sealing of a top element to a container wherein during storage the top element has a high top loading which cannot be sealed utilizing customary sealants.

More particularly, there has been recently developed a combination pour spout and closure assembly for a container which includes a fitment which is secured to the container and a closure cap which is secured to the fitment. When initially formed, the fitment was retained on the container by way of a mechanical interlock and sealed with respect thereto by means of a conventional gasket material, such as plastisol. However, when these containers, after filling, were stored in a warehouse in high stacks, the top loading on the lower containers was such that the gasket material and in some instances the neck finish of the container was distorted to the extent that leakage occurred. Numerous solutions to the problem were advanced without success until the present invention.

In accordance with the invention, a hot melt material is utilized as the gasket with the hot melt material being shaped within the top element or fitment and while the hot melt material is still hot and flowable, the top element is applied to the container and mechanically interlocked therewith. In the formation of the mechanical interlock, the hot melt material is compressed and caused to flow around the neck finish of the container in an extruded manner so as to generally fill the space between the top element and the container neck finish. The net result is that after the hot melt material solidifies, it not only functions as the required gasket, but also functions as a support preventing deformation of the container neck finish and resisting downward movement of the top element relative to the container neck finish under a high top loading.

Another feature of the invention relates to the fact that the fitment or top element is to be applied to newly formed containers which, after the fitment is applied, are inspected. If defective containers are found, it is desired to salvage the material of both the container and the top element or fitment. In accordance with the invention, as soon as the top element is applied and after the hot melt material has set, the containers are inspected and those containers which are found to be defective are reheated and disassembled from the fitment for salvage.

A still further feature of the invention is the adaptability of a known type of dispensing head to apply the hot melt material to the top element or fitment in a prescribed repeatable pattern.

With the above and other objects in view that will hereinafter appear, the nature of the invention will be more clearly understood by reference to the following detailed description, the appended claims, and the several views illustrated in the accompanying drawings.

Figure 1:
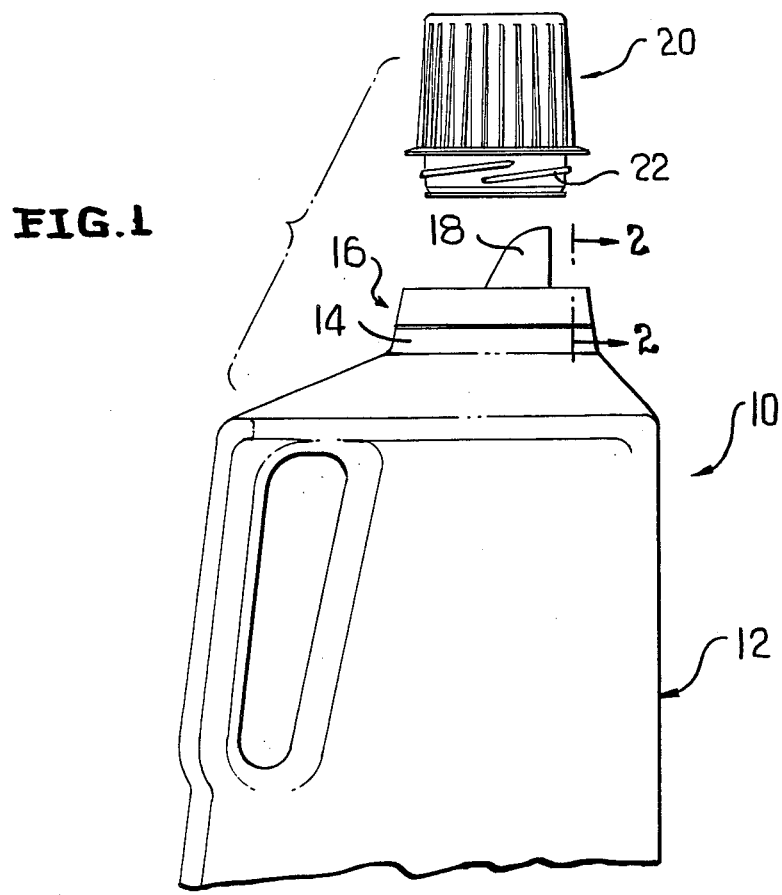
FIG. 1 is an exploded elevational view of a container in accordance with this invention showing the fitment in place on the container and the closure for the fitment being separated therefrom.

Referring now to the drawings in detail, it will be seen that there is illustrated in FIG. 1 a recently developed dispensing container generally identified by the numeral 10. The dispensing container 10 includes a blow molded container 12 having a neck finish 14 on which there is mounted a fitment generally identified by the numeral 16. The fitment, which is not the subject of this invention, has a pouring spout 18 for the dispensing of a liquid product stored within the container 12. The pouring spout 18 is of a construction wherein not only may the product be filled into the container 12 through the pouring spout, but also in the dispensing of the liquid product any of the product being received in the spout but not being poured away from the container will automatically be returned into the container.

There is also a closure cap 20 which preferably has a lower threaded portion 22 which will be internally threaded into the fitment 16.

This invention relates to the securement and sealing of the fitment 16 to the neck finish 14 in a manner wherein when a high top load is applied to the fitment 16 through the cap 20, a seal, to be described hereinafter, between the fitment and the container neck finish will not be disturbed so as to result in a leak.

Figure 2:
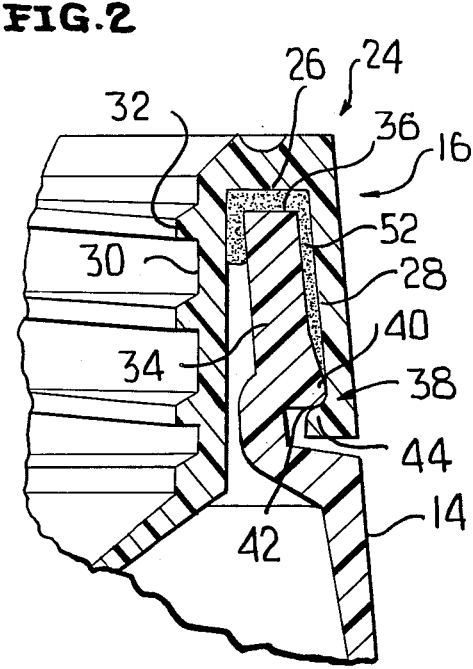
FIG. 2 is an enlarged fragmentary vertical sectional view taken generally along the line 2—2 of FIG. 1 and shows the utilization of hot melt material in accordance with this invention to function both as a gasket and a support between the fitment and the container neck finish.

With reference to FIG. 2, it will be seen that the fitment 16 has a downwardly opening channel shaped cross sectional portion 24 which is generally annular. The portion 24 has an end wall 26, and outer side wall 28 and an inner side wall 30. The inner side wall 30 may have formed on the inner surface thereof threads 32 which cooperate with the threads 22 of the cap 20 to retain the cap in place on the fitment 16.

The container neck finish 14 is generally in the form of a tubular or cylindrical portion 34 which terminates in an end sealing surface 36. Cooperating mechanical interlocking means 38 on the neck finish 14 and on the side wall 28 mechanically interlock the fitment 16 with the neck finish 14. In the embodiment illustrated in FIG. 2, the mechanical interlock may be formed by a radially outwardly projecting rib 40 on the neck finish 14 which defines an axially downwardly facing shoulder 42 beneath which a radially inwardly directed flange or bead 44 on the side wall 28 engages. Incidentally, the side wall 28 is basically in the form of a skirt.

Figure 3:
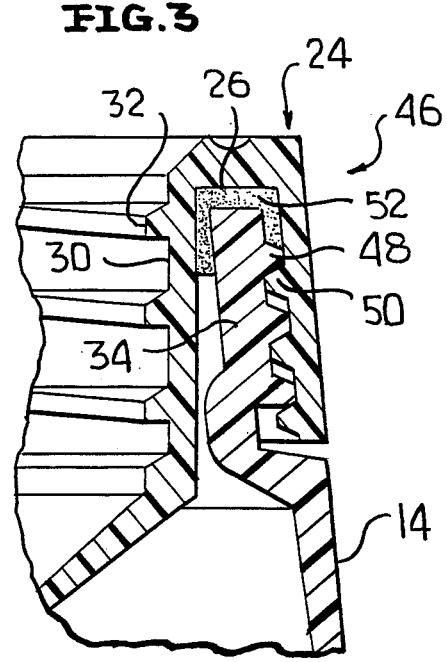
FIG. 3 is a sectional view similar to FIG. 1 but showing threads as the mechanical means for mechanically retaining the fitment on the container neck finish.

In FIG. 3 there is illustrated a modified form of mechanical interlocking means identified by the numeral 46 and including screw threads 48 on the radially outer surface of the neck finish 14 engaged by screw threads 50 on the radially inner surface of the skirt or side wall 28.

With reference to FIG. 3, which will be described in detail hereinafter, it will be seen that a prescribed annular band of hot melt material 52 is applied in the channel 24. The shape and volume of the hot melt material 52 is such that before engagement of the interlocking means 38 or 46 is completed, the end sealing surface 26 will engage the hot melt material 52. Then as the channel 24 further receives the neck finish 14, the hot melt material 52, which is still hot and flowable, is extruded as the interlocking means are completely engaged so that the hot melt material 52 flows around the upper end portion of the neck finish 14 with this relationship being maintained by the interlocking means 38 or 46 until such time as the hot melt material 52 sets.

After the hot melt material 52 sets, it performs a dual function. First of all, it performs the function of a gasket. More importantly, it performs the function of a support which prevents or at least limits further downward movement of the fitment 16 with respect to the container neck finish 14. Thus when the containers are filled and closed and thereafter stacked during storage, and a high top loading is applied to the cap 20, the solidified hot melt material 52 serves as a support for the fitment 16 relative to the neck finish 14 as opposed to being squeezed out as occurs with conventional gasket materials, such as plastisols. It also supports the neck finish 14 against any deformation.

Because of the supporting function, the solidified hot melt material 52 prevents the forming of a leak passage between a hot melt material and the container neck finish 14 as has occurred in the past when a conventional gasket material, such as a plastisol, has been utilized.

At this time, it is pointed out that the containers 12 are preferably in the form of blow molded plastic bottles, while the fitment 16 and the cap 20 are preferably injection molded from plastic material. Further, as is shown in FIG. 5, the fitments 16 are applied to the newly blow molded bottles as they pass from a blow molding machine.

Figure 5:
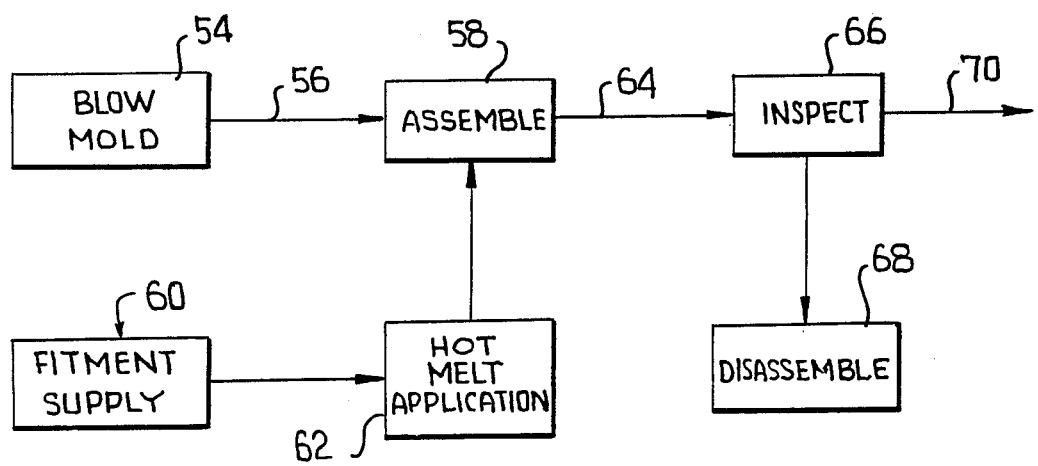
FIG. 5 is a block diagram showing the operations involved in forming and applying the fitment to a blow molded container.

The containers or bottles 12, as shown in FIG. 5, are formed in a conventional blow molding machine generally identified by the numeral 54. The newly formed containers 12 pass along a conveyor 56 to an applicator station 58.

At the applicator station 58, fitments 16 delivered from a fitment supply 60 to a hot melt applicator 62, whereat the hot melt material 52 is applied to the fitments 16, are placed on the containers. The time delay between the application of the hot melt material 52 and the application of the fitment 16 to the container 12 will be on the order of two seconds.

The containers 12 having the fitments 16 applied thereto will be passed along a conveyor 64 which may be the same conveyor as conveyor 56 to an inspection station 66 wherein the containers 12 with the fitments 16 thereon are inspected. When a defect is observed, the defective container is removed from the conveyor at the inspection station 66 and moved to an area or station 68 whereat the fitment is removed from the container so that the materials of both the fitment and container may be salvaged, it being noted at this time that the materials of the container and fitment being different.

Those containers having the fitments thereon and inspected to be good then pass down the line on a conveyor 70 which may be the same conveyor as the conveyor 64.

Figure 4:
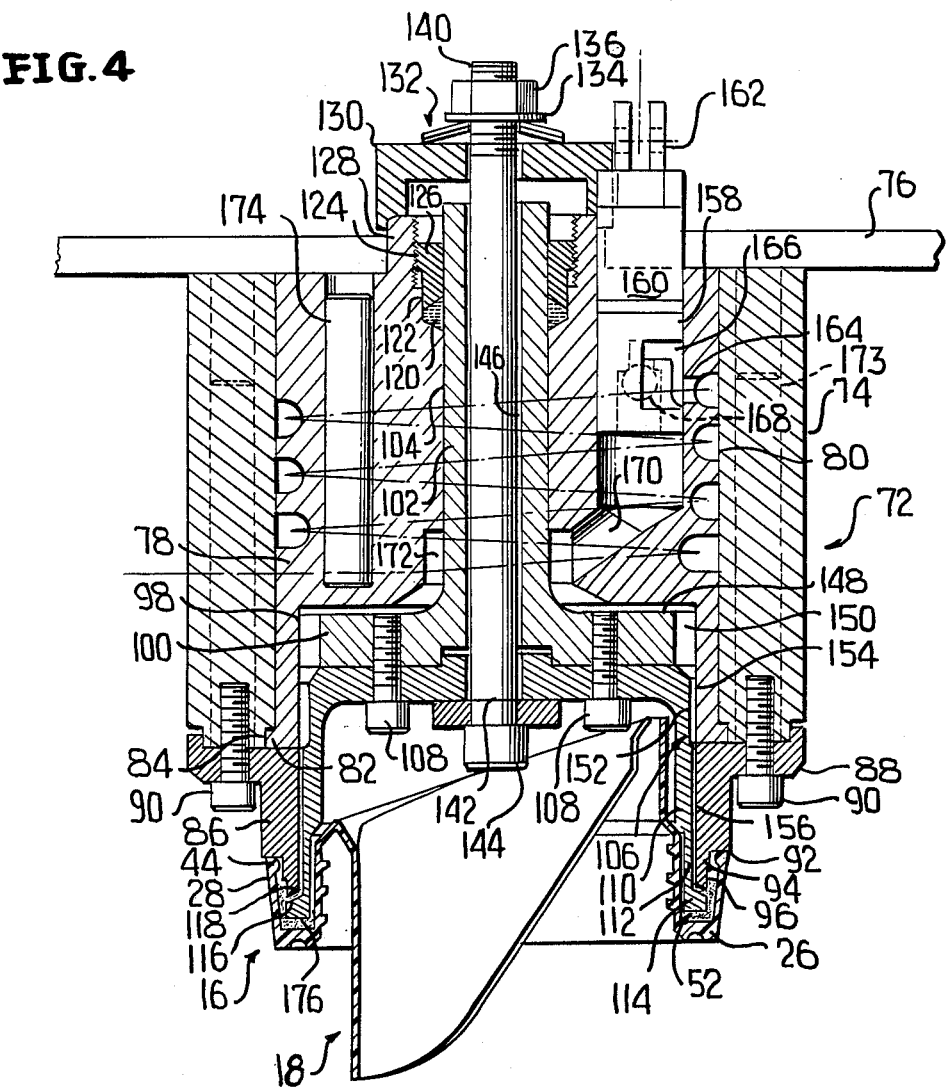
FIG. 4 is a sectional view through a dispensing head showing the same being utilized to apply a continuous band of hot melt material within the fitment in a preselected pattern.

Reference is now made to FIG. 4 showing the dispensing head for applying the hot melt adhesive and the manner in which the hot melt material is applied to a typical top element which in the illustrated embodiment is the fitment 16.

Before going into the details of the dispensing head, attention is directed to the fact that a somewhat similar dispensing head is the subject of U.S. Pat. No. 4,523,540. Further, that dispensing head has been improved by others to replace the flexible valve member with a rigid valve member which is carried by a support rod which is spring loaded to normally retain the valve member in a closed position. The dispensing head of FIG. 4 to be described hereinafter is particularly adapted for applying the hot melt material in a prescribed pattern and volume to a top element such as the fitment 16.

Referring now specifically to FIG. 4, it will be seen that the hot melt dispensing head is generally identified by the numeral 72. The dispensing head 72 includes an annular body 74 which is mounted on a suitable mounting plate 76. The annular body 74 has telescoped therein an annular member 78 which has formed in the outer surface thereof a generally helical flow passage arrangement 80 for hot melt material. The annular member 78 is provided with a radially outwardly directed lip 82 at its lower end which is seated in an annular notch 84 formed in the body 74. This prevents axial upward movement of the annular member 78 relative to the annular body 74.

The body 74 carries at its lower end a flanged tubular support 86. The tubular support 86 has the flange 88 thereof clamped against the underside of the housing 74 by way of fasteners 90 and also bears against the tubular member 78 to seat the lip 82 in the notch 84 and thus prevent separation of the housing 74 and the tubular member 78. The tubular support 86 has a downwardly facing shoulder or support surface 92 against which the free end of the side wall or skirt 28 is seated to position the fitment 16 relative to the dispensing head.

The support member 86 also has a lower portion 94 extending axially beyond the supporting surface 92 for reception within the channel 24 of the fitment 16. The extension 94 is provided on the radially outer surface thereof along a lower portion thereof with an annular recess 96, the function of which will be described in detail hereinafter.

The annular member 78 has a lower cavity 98 which is aligned with the radially inner surface of the annular support 86, the interior of the support 86 forming a continuation of the cavity 98.

A piston-like member 100 is positioned in the upper part of the cavity 98 and is provided with a tubular stem 102 which extends through a bore 104 defined by the radially inner surface of the annular member 78.

The piston-like member 100 has secured to the under surface thereof an inverted cup-shaped valve member 106 by means of fasteners 108. The valve member 106 has a depending skirt 110 which, in turn, has a lower portion 112 of a reduced wall thickness. The lower portion 112 terminates in a radially outwardly directed lip 114. The lip 114, radially outwardly of the lower portion 112, defines a valve face 116 which faces and forms a seal with a lower end of the support 86 which defines a valve seat 118.

The valve stem 104 is sealed relative to the annular member 78 by means of a gasket 120 seated in an upper enlargement 122 of the bore 104. The enlargement 122 in turn, terminates in an upper internally threaded bore 124 in which a packing nut member 126 is positioned.

The annular member 78 has a central upwardly projecting extension 128 on which there is seated a support member 130. The support member 130 carries stacked Belleville washers 132. The washers 132 bear against the underside of a washer 132 which, in turn, engages the underside of a nut 136 which is threaded on an externally threaded portion 140 of an elongated bolt 142 having a head 144. The bolt 142 passes through a bore 146 which extends through the valve stem 102 and the upper part of the valve member 106.

The nut 136 is adjusted so as to maintain the face 118 seated against the valve seat 116. The piston-like member 100 is of a lesser diameter than the diameter of the cavity 98 so as to define an annular cavity 150 in communication with the cavity 148. Also, the upper portion of the skirt 110 is of a reduced diameter as at 150 to form a narrow continuation 154 of the cavity 150. Finally, the exterior surface of the skirt 110 is provided with axially extending, circumferentially spaced slots 156 which extend down to the valve face 116 and thus form continuations of the cavity 150.

The annular member 78 is provided with a bore parallel to the bore 104, which bore defines a cylinder 158 in which there is mounted for reciprocation a pump piston 160. The pump piston 160 has an actuator of which only a yoke portion 162 is shown.

The annular member 78 is provided with a radial passage 164 which communicates with the upper part of the passage 80. At this time it is to be understood that hot melt material is directed into the lower part of the helical passage 80.

The pump piston 160 is provided with a passage 166 therethrough which includes an internal ball check valve 168.

The lower end of the pump cylinder 158 has a passage 170 which extends into an annular passage 172 which surrounds a lower part of the valve stem 102 and is in communication with the cavity 148.

For information purposes only, it is to be noted that the housing 74 is provided with circumferentially spaced heating elements 173 which the annular member 78 is provided with circumferentially spaced heating elements 174.

It is to be understood that when the piston pump 160 is actuated, it will have a preselected stroke so as to dispense a preselected volume of hot melt material. The pressure of the hot melt material in the cavity 148 will act on the piston-like member 100 to move the same downwardly against the resistance of the Belleville washers 132 so as to move the valve face 116 away from the valve seat 118 a prescribed distance. When the valve member is in its open position, the extreme end of the skirt 110, including the underside of the lip 114, which extreme end is identified by the numeral 176, is spaced from the end wall 26 of the channel 24 a prescribed distance. This spacing, in conjunction with the reduced diameter portion 96 defines an area into which the hot melt material is dispensed to define an initial shape for the hot melt material 52.

As soon as the hot melt material 52 has been applied to the fitment 16, it is then placed on the container 12 and mechanically locked in place. As previously pointed out, when the fitment 16 is mechanically locked in place on the neck finish 14 of the container 12, the hot melt material will be compressingly engaged by the end sealing surface 16 and there will be an extrusion of the flowable hot melt material so as to pass around the tubular portion 34 of the neck finish and to fill the then upper part of the channel 24 to function both as a gasket and as a support.

Although only a preferred embodiment of the invention has been specifically illustrated and described herein, it is to be understood that minor variations may be made in the relationship of the fitment to the container neck finish, and also the relationship of the hot melt dispensing head with respect to the fitment. Further, the hot melt material will be varied as to its composition in accordance with the specific requirements.

We claim:

1. A method of applying a top element to a plastic container to be subjected to a high top loading, the plastic container having a neck finish including a top sealing surface, said method comprising the steps of providing cooperating mechanical interlocking means on the plastic container and the top element, applying a ring of hot melt material in a flowable molten state to the top element in position to engage the top sealing surface on the plastic container, and while the hot melt material is still in a readily flowable state applying the top element to the plastic container and mechanically locking the top element to the plastic container utilizing the cooperating mechanical interlocking means to compress the hot melt material within the top element against the top sealing surface with the still flowable hot melt material flowing from its original shape to form both a gasket and a rigid support reinforcing the container neck finish after the hot melt material solidifes whereby the solidifed hot melt material restricts movement of the top element down on the plastic container under the high top loading and thereby prevents both deformation of the container neck finish and formation of a leak path between the top sealing surface on the plastic container and the top element when the top loading is removed.

2. A method according to claim 1 wherein the top element is formed with a downwardly opening channel for receiving the hot melt material and a tubular end portion of the plastic container including the top sealing surface.

3. A method according to claim 1 wherein the plastic container is newly molded and the top element is applied as the plastic container moves from a molding apparatus.

4. A method according to claim 3 wherein the plastic container with the top element thereon is inspected, and when a defect is found the plastic container and top element are reheated and the top element is removed from the plastic container for salvage.

5. A method according to claim 1 wherein the plastic container with the top element thereon is inspected, and when a defect is found the plastic container and top element are reheated and the top element is removed from the plastic container for salvage.

6. A method according to claim 1 wherein the hot melt material is applied to the top element as a one-piece continuous ring containing a predetermined volume of the hot hot melt material.

* * * * *